(12) United States Patent
Tanigawa et al.

(10) Patent No.: US 8,477,234 B2
(45) Date of Patent: Jul. 2, 2013

(54) BRIGHTNESS SENSING SYSTEM AND ILLUMINATION SYSTEM USING THE SAME

(75) Inventors: Tetuya Tanigawa, Kobe (JP); Shinji Matsuda, Narashino (JP); Tosikazu Kawasima, Katano (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 187 days.

(21) Appl. No.: 12/805,284

(22) Filed: Jul. 22, 2010

(65) Prior Publication Data

US 2011/0019031 A1  Jan. 27, 2011

(30) Foreign Application Priority Data

Jul. 23, 2009  (JP) .................. 2009-172423

(51) Int. Cl.
*H04N 5/222* (2006.01)
(52) U.S. Cl.
USPC .......................... 348/370; 348/69; 348/222.1
(58) Field of Classification Search
USPC .......... 348/370, 69, 222.1; 362/4, 33; 396/71, 396/524, 532
See application file for complete search history.

(56) References Cited

U.S. PATENT DOCUMENTS

| | | | |
|---|---|---|---|
| 5,710,602 A * | 1/1998 | Gardos et al. ................. | 348/586 |
| 2002/0015097 A1 | 2/2002 | Martens et al. | |
| 2003/0099407 A1 | 5/2003 | Matsushima | |
| 2004/0001147 A1 * | 1/2004 | Vella et al. ............... | 348/208.99 |
| 2008/0143883 A1 | 6/2008 | Hsuan | |
| 2009/0073287 A1 | 3/2009 | Shimizu | |

FOREIGN PATENT DOCUMENTS

| | | |
|---|---|---|
| EP | 2026531 A1 | 2/2009 |
| JP | 2004-501496 | 1/2004 |
| WO | 01/99474 | 12/2001 |

OTHER PUBLICATIONS

Extended European search report of application No. 10007528 dated Oct. 22, 2010, 5 pages.

* cited by examiner

*Primary Examiner* — Sinh Tran
*Assistant Examiner* — Paul Berardesca
(74) *Attorney, Agent, or Firm* — Bacon & Thomas, PLLC

(57) ABSTRACT

A brightness sensing system includes an image pickup unit for taking an image of a target space and a calculation unit for calculating the brightness of an image pickup area based on the image taken by the image pickup unit. In the brightness sensing system, if the difference or the ratio between an image as a whole and a pixel block formed of one or more pixels is equal to or greater than a threshold in terms of brightness change between a previously-taken reference image and a currently-taken target image, the calculation unit excludes the pixel block from comparison candidates and compares the brightness of the target image with the brightness of the reference image based on the remaining pixels other than the pixel block.

6 Claims, 4 Drawing Sheets

BRIGHTNESS SENSING SYSTEM AND ILLUMINATION SYSTEM USING THE SAME

FIELD OF THE INVENTION

The present invention relates to a brightness sensing system and an illumination system using same.

BACKGROUND OF THE INVENTION

Conventionally, there is known an illumination system in which a CCD (Charged-Coupled Device) camera is used as a sensor for sensing brightness (see, e.g., Japanese Patent Application Publication No. 2004-501496, Paragraph [0016] and FIG. 3). In this illumination system, the brightness of an image pickup area is calculated by averaging the brightness of light detected by pixels in the image data taken by a CCD camera. Based on the results of this calculation, the dimming level of an illumination device is increased or decreased to thereby keep the illuminance of a target space at a substantially constant level.

In the above-described illumination system, the detected brightness would be increased if the reflectance of the target space is changed, e.g., by a white paper sheet placed on a desk. Thus, it may be difficult to keep the illuminance on the desk surface at a constant level. Further, pixels whose brightness exceeds a specified threshold are all excluded from the pixels to be employed in the brightness detection. This makes it impossible to exclude only the pixel area having a change in brightness (or reflectance). As a result, it is sometimes difficult to accurately detect the brightness of the target space.

SUMMARY OF THE INVENTION

In view of the above, the present invention provides a brightness sensing system capable of accurately and reliably detecting the brightness of a target space and an illumination system using the same.

In accordance with an aspect of the present invention, there is provided a brightness sensing system including: an image pickup unit for taking an image of a target space; and a calculation unit for calculating the brightness of an image pickup area based on the image taken by the image pickup unit.

In the brightness sensing system, if the difference or the ratio between an image as a whole and a pixel block formed of one or more pixels is equal to or greater than a threshold in terms of brightness change between a previously-taken reference image and a currently-taken target image, the calculation unit excludes the pixel block from comparison candidates and compares the brightness of the target image with the brightness of the reference image based on the remaining pixels other than the pixel block.

In this configuration, the pixel block whose brightness change is excessively greater than the brightness change of the image as a whole is picked out and excluded from the reference image and the target image. This makes it possible to detect the brightness excepting the reflectance-changed area of the target space. As a result, it is possible to accurately and reliably detect the brightness of the target space.

Further, the calculation unit may compare the brightness of the target image with the brightness of the reference image based on the average brightness of the remaining pixels.

In this configuration, the average brightness is used in comparing the brightness of the target image with that of the reference image. Accordingly, the illuminance of the target space can be easily calculated from the average brightness.

Further, the calculation unit may compare the brightness of the target image with the brightness of the reference image based on the total brightness of the remaining pixels.

In this configuration, the total brightness is used in comparing the brightness of the target image with that of the reference image. This makes it possible to omit the step of calculating the average brightness.

In accordance with another aspect of the present invention, there is provided an illumination system including: the brightness sensing system of claim 1; and an illumination device for varying a dimming level to keep the illuminance of the target space substantially at a constant level depending on the results of comparison of the calculation unit of the brightness sensing system.

Herein, the illumination device increases the dimming level if the calculation unit determines that the target image is brighter than the reference image but reduces the dimming level if the calculation unit determines that the target image is darker than the reference image.

With this configuration, use of the brightness sensing system described above makes it possible to provide an illumination system capable of accurately and reliably detecting the brightness of the target space and keeping the illuminance of the target space at a constant level.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, a brightness sensing system in accordance with an embodiment of the present invention and a illumination system using same will now be described with reference to FIGS. 1 to 3C, which form a part hereof.

Figure 2A:
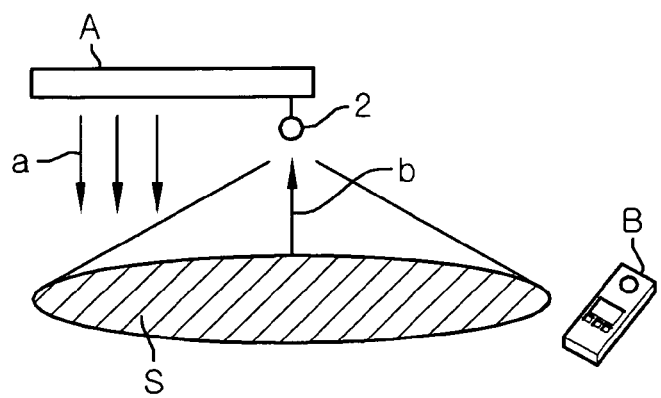
FIGS. 2A to 2C are schematic views for explaining the operations of the illumination system in accordance with the embodiment of the present invention.
Figure 2B:
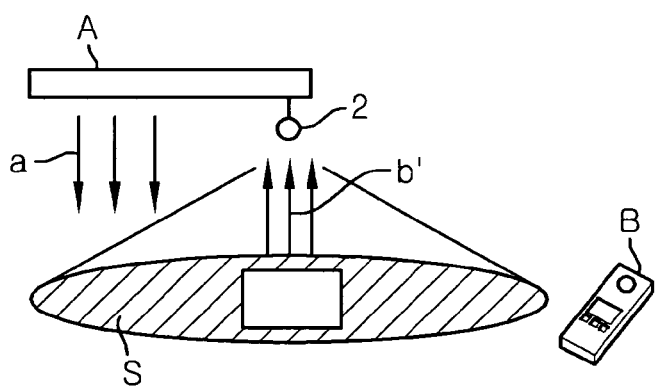
Figure 2C:
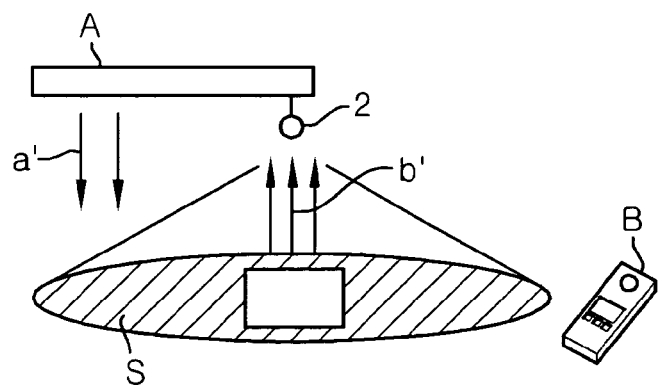

The brightness sensing system in the present embodiment is used in detecting the brightness (illuminance) of a specified irradiation surface S to which light is irradiated from an illumination device A as shown in FIGS. 2A to 2C. The illumination system in the present embodiment is designed to keep the illuminance on the irradiation surface S at a substantially constant level by using the brightness sensing system.

Figure 1:
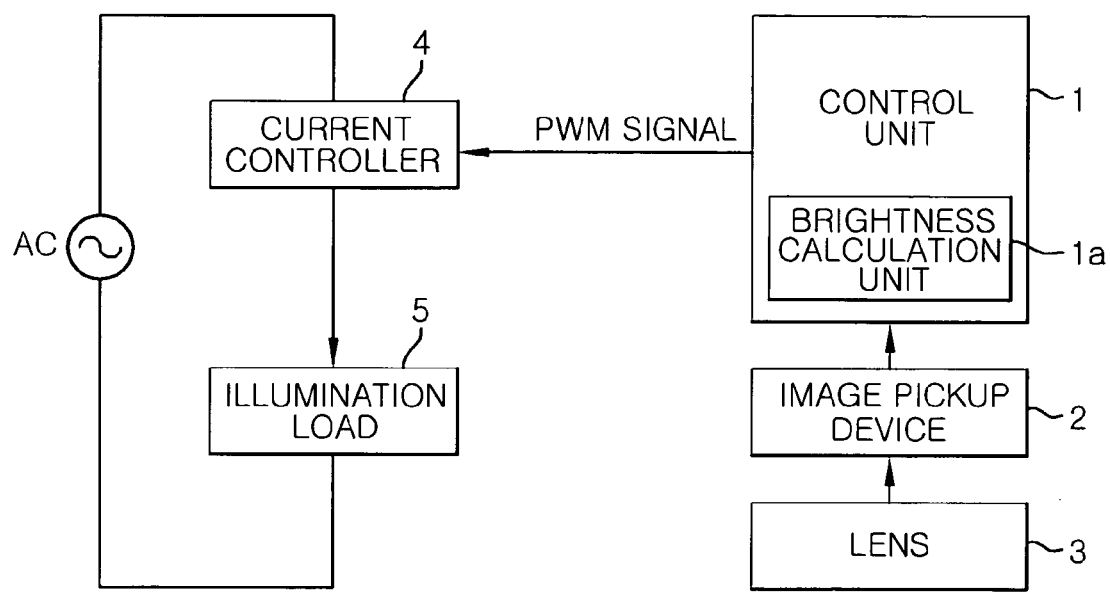
FIG. 1 is a schematic block diagram showing an illumination system in accordance with an embodiment of the present invention.

Referring to FIG. 1, the brightness sensing system of the present embodiment includes an image pickup device (or an image pickup unit) 2 formed of, e.g., a CCD sensor or a CMOS sensor, a lens 3 for determining the field of view of the image pickup device 2 and a control unit 1 provided with a brightness calculation unit 1a for calculating the brightness of an image pickup area (the irradiation surface S in the present embodiment) based on the image taken by the image pickup device 2.

The illumination system of the present embodiment includes, in addition to the brightness sensing system described above, a illumination device A having an illumination load 5 formed of, e.g., a incandescent bulb, a fluorescent lamp or an LED, and a current controller 4 for controlling an electric current flowing through the illumination load 5 depending on the on-duty ratio of a PWM (Pulse Width Modulation) signal outputted from the control unit 1. The illumination load 5 is turned on at the dimming level corresponding to the PWM signal. Reference character "AC" in FIG. 1 designates a commercial AC power source for supplying electric power to the illumination load 5.

In the illumination system of the present embodiment, a reference image P1 (see FIG. 3A) of 4×5 pixel size previously taken by the image pickup device 2 is stored in a storage unit (not shown) of the control unit 1. The brightness calculation unit 1*a* compares the brightness of the reference image P1 with the brightness of a target image P2 (see FIG. 3A) currently taken. A PWM signal corresponding to the comparison result is outputted from the control unit 1 to the current controller 4.

The current controller 4 feeds an electric current to the illumination load 5 in response to the PWM signal. For example, the current controller 4 reduces the dimming level of the illumination load 5 if the target image P2 is brighter than the reference image P1. In contrast, the current controller 4 increases the dimming level of the illumination load 5 if the target image P2 is darker than the reference image P1. As a consequence, it becomes possible to keep the illuminance of the irradiation surface S, i.e., the target space, substantially equal to the illuminance corresponding to the reference image P1.

FIG. 2A is a schematic view showing the illumination system in accordance with the embodiment of the present invention. If the light (indicated by arrows a in FIG. 2A) is irradiated from the illumination device A toward the irradiation surface S, the image pickup device 2 captures the light (indicated by an arrow b in FIG. 2A) reflected from the irradiation surface S. The reference image P1 is obtained, e.g., at a condition that the dimming level of the illumination device A is set to, e.g., 50%, while the illuminance of the irradiation surface S is 750 1× (reference illuminance). Reference character "B" in FIGS. 2A to 2C designates an illuminometer.

If a white paper sheet 6 is placed on the irradiation surface S as shown in FIG. 2B, the reflectance of the irradiation surface S is increased by the white paper sheet (see arrows b' in FIG. 2B). Thus, the target image P2 taken by the image pickup device 2 gets brighter than the reference image P1. For that reason, if all the pixels are used in the comparison of the images P1 and P2 for example, the dimming level of the illumination device A would be reduced to, e.g., 40% (see arrows a' in FIG. 2C), so that the target image P2 can be equal in brightness to the reference image P1. As a result, the illuminance of the irradiation surface S is decreased to, e.g., 600 1×, which makes it impossible to keep the illuminance of the irradiation surface S equal to the reference illuminance corresponding to the reference image P1.

In the present embodiment, the accuracy of comparison of the reference image P1 and the target image P2 is increased by excluding pixels, which show a sharp change in brightness due to the change in reflectance, from comparison candidates as in the following procedure. Hereinafter, the pixel excluding procedure, which is performed on a pixel block basis, will be described with reference to FIGS. 3A to 3C. In this example, one pixel constitutes one pixel block, and the reference numerals filled in the pixels in FIGS. 3A to 3C indicate the pixel (or pixel block) numbers.

Figure 3A:
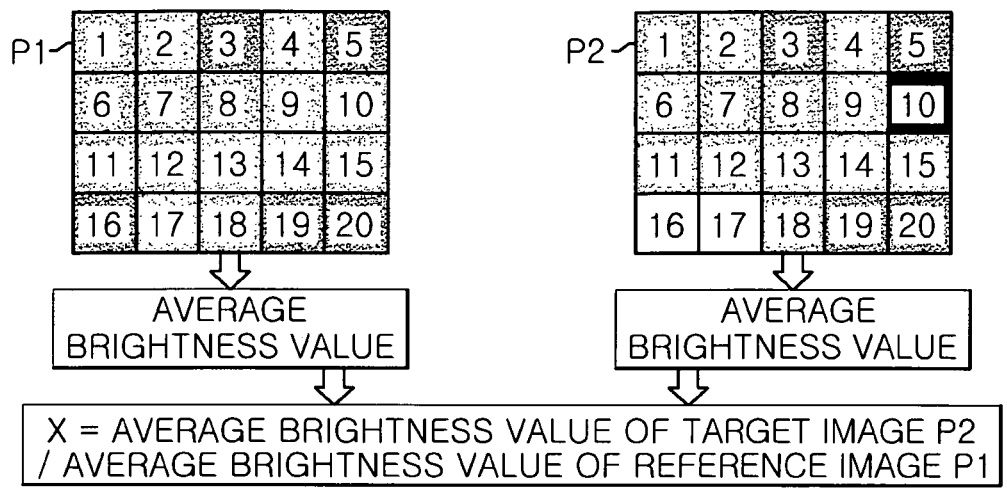
FIGS. 3A to 3C are views for explaining the operations of a brightness sensing system employed in the illumination system in accordance with the embodiment of the present invention.

With respect to each of the previously taken reference image P1 and the currently taken target image P2, the average brightness of all pixel blocks 1 to 20 is first calculated as illustrated in FIG. 3A. Then, the brightness ratio X (X=X2 (average brightness of target image P2)/X1 (average brightness of reference image P1)) is calculated, wherein the average brightness of an image is, e.g., the sum of brightness of all the pixels in the image divided by the number thereof.

Figure 3B:
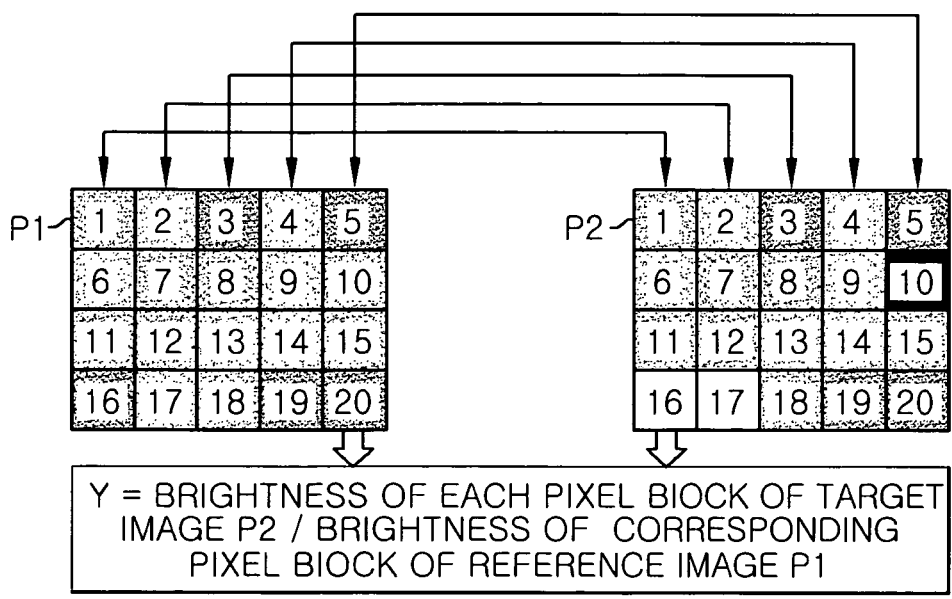

Next, as illustrated in FIG. 3B, the brightness ratio Y for every pixel block (Y=Y2 (brightness of each pixel block of target image P2)/Y1 (brightness of the corresponding pixel block of reference image P1)) is calculated from the brightness of each of the pixel blocks 1 to 20 of the target image P2 and the brightness of each of the corresponding pixel blocks 1 to 20 of the reference image P1. Then, the pixel blocks whose brightness ratio Y is equal to or greater than, e.g., two (threshold 1) times the brightness ratio X or equal to or smaller than, e.g., one half (threshold 2) of the brightness ratio X is picked out.

Alternatively, the difference in brightness between the reference image P1 and the target image P2 may be used to pick out the pixel blocks having a great change in brightness instead of using the brightness ratio of the reference image P1 and the target image P2. In this case, the brightness difference X' (X'=X2−X1) and the brightness difference Y' for every pixel block (Y'=Y2−Y1) are calculated, and then the pixel blocks whose brightness difference Y' is equal to or greater than, e.g., N (threshold 3) times the brightness difference X' or equal to or smaller than, e.g., 1/M (threshold 4) of the brightness difference X') may be picked out, N and M being numbers greater than one.

Further, in order to pick out pixel blocks subjected to excessive change, it may be preferable that the pixel blocks whose brightness difference between X (or X') and Y (or Y') is equal to or greater than a threshold or equal to or smaller than another threshold is picked out.

Further, in order to pick out pixel blocks that are excessively bright or dark, it may be preferable that only one of thresholds, e.g., threshold 1 or 2 may be used to determine the pixel blocks to be picked out.

Figure 3C:
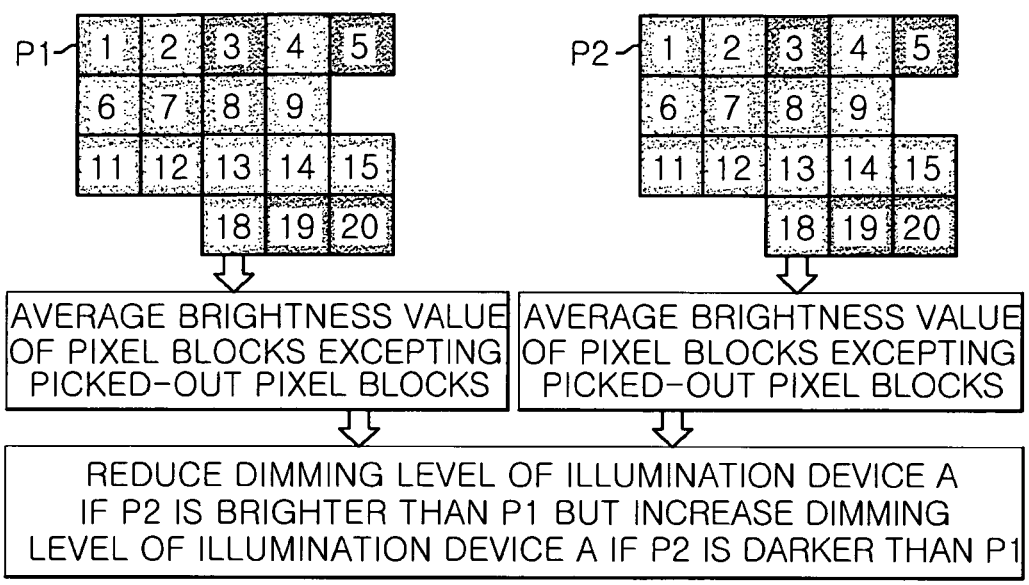

For example, if the pixel blocks 10, 16 and 17 are picked out in the step illustrated in FIG. 3B, the average brightness of each of the reference image P1 and the target image P2 is calculated using the remaining pixel blocks other than the pixel blocks 10, 16 and 17 as illustrated in FIG. 3C. In case where the average brightness of the target image P2 thus obtained is greater than that of the reference image P1 thus obtained, it is determined that the illuminance of the irradiation surface S is higher than the reference illuminance (750 1× in this example). Therefore, a PWM signal for reducing the dimming level of the illumination load 5 is outputted from the control unit 1 to the current controller 4. Responsive to the PWM signal, the current controller 4 controls the electric current flowing to the illumination load 5, thereby reducing the dimming level of the illumination load 5. As a result, the illuminance of the irradiation surface S is kept substantially equal to the reference illuminance corresponding to the reference image P1.

If the average brightness of the target image P2 obtained in FIG. 3C is smaller than that of the reference image P1 obtained in FIG. 3C, it is determined that the illuminance of the irradiation surface S is lower than the reference illuminance. Therefore, a PWM signal for increasing the dimming level of the illumination load 5 is outputted from the control unit 1 to the current controller 4. Responsive to the PWM signal, the current controller 4 controls the electric current flowing to the illumination load 5, thereby increasing the dimming level of the illumination load 5. Consequently, the illuminance of the irradiation surface S is kept substantially equal to the reference illuminance corresponding to the reference image P1.

With the present embodiment, the pixel block area whose brightness change is excessively greater than the brightness change of the image as a whole is picked out and excluded from the reference image P1 and the target image P2. This makes it possible to detect the brightness excepting the reflectance-changed area of the irradiation surface (target space) S. As a result, it is possible to accurately and reliably detect the brightness of the irradiation surface S. Since the average brightness is used in comparing the brightness of the target image P2 with that of the reference image P1, the illuminance of the irradiation surface S can be easily estimated from the average brightness.

Although the brightness of the target image P2 is compared with that of the reference image P1 using the average brightness in the present embodiment, it may be possible to use, e.g., the total brightness of the pixel blocks for that purpose. In this case, the step of calculating the average brightness can be omitted. That is, the total brightness of all the pixels is calculated with respect to each of the reference image P1 and the target image P2 to calculate the brightness ratio X. Then, after the pixel blocks subjected to excessive change are excluded, the total brightness of each of the reference image P1 and the target image P2 is calculated by using the remaining pixels, i.e., the pixels of the remaining pixel blocks to make the illuminance between the reference image P1 and the target image P2 substantially equal.

Use of the brightness sensing system of the present embodiment makes it possible to provide an illumination system capable of accurately and reliably detecting the brightness of the irradiation surface S and keeping the illuminance of the irradiation surface S at a constant level.

Although the thresholds used in picking out the pixels to be excluded from the comparison candidates may be arbitrarily set depending on the use environment or the like.

Although one pixel constitutes one pixel block in the step illustrated in FIG. 3B, a plurality of pixels may constitute one pixel block. In such a case, the brightness of each pixel block (Y1 and Y2) is obtained by averaging or summing brightness of the pixels constituting that pixel block. Although the embodiment has been described by taking an example where the white paper sheet 6 is placed on the irradiation surface S, it is also possible to exclude certain pixels from comparison candidates in an instance where a man with black hair stays within the image-taking area. As a result, it is equally possible to keep the illuminance of the irradiation surface S at a constant level.

While the invention has been shown and described with respect to the embodiments, it will be understood by those skilled in the art that various changes and modification may be made without departing from the scope of the invention as defined in the following claims.

What is claimed is:

1. A brightness sensing system comprising:
    an image pickup unit for taking a previously taken reference image and a currently taken target image of a target space; and
    a calculation unit,
    wherein each of the reference image and the target image contains a predetermined number of pixel blocks each being formed of one or more pixels, and
    wherein the calculation unit is configured to:
    calculate a threshold value based on an overall brightness change between the predetermined number of pixel blocks of the reference image and those of the target image,
    obtain a pixel block based brightness change between each pixel block in the target image and its corresponding pixel block in the reference image, and
    compare a brightness of the target image with that of the reference image based on remaining pixel blocks other than each pixel block whose pixel block based brightness change is not less than the threshold value to thereby determine whether the target image is brighter than the reference image or not.

2. The brightness sensing system of claim 1, wherein the calculation unit compares the brightness of the target image with the brightness of the reference image based on an average brightness of the remaining pixel blocks.

3. The brightness sensing system of claim 1, wherein the calculation unit compares the brightness of the target image with the brightness of the reference image based on a total brightness of the remaining pixel blocks.

4. An illumination system comprising:
    the brightness sensing system of claim 1; and
    an illumination device for varying a dimming level to keep an illuminance of the target space substantially at a constant level depending on the result of comparison of the calculation unit of the brightness sensing system,
    wherein the illumination device increases the dimming level if the calculation unit determines that the target image is darker than the reference image but reduces the dimming level if the calculation unit determines that the target image is brighter than the reference image.

5. An illumination system comprising:
    the brightness sensing system of claim 2; and
    an illumination device for varying a dimming level to keep an illuminance of the target space substantially at a constant level depending on the result of comparison of the calculation unit of the brightness sensing system,
    wherein the illumination device increases the dimming level if the calculation unit determines that the target image is darker than the reference image but reduces the dimming level if the calculation unit determines that the target image is brighter than the reference image.

6. An illumination system comprising:
    the brightness sensing system of claim 3; and
    an illumination device for varying a dimming level to keep an illuminance of the target space substantially at a constant level depending on the result of comparison of the calculation unit of the brightness sensing system,
    wherein the illumination device increases the dimming level if the calculation unit determines that the target image is darker than the reference image but reduces the dimming level if the calculation unit determines that the target image is brighter than the reference image.

* * * * *